(12) United States Patent
Weinert et al.

(10) Patent No.: US 7,024,089 B2
(45) Date of Patent: Apr. 4, 2006

(54) FIBER DISTRIBUTION FRAME ARRANGEMENT HAVING A CENTRALIZED CONTROLLER WHICH UNIVERSALLY CONTROLS AND MONITORS ACCESS TO FIBER DISTRIBUTION FRAMES

(75) Inventors: Stephen J. Weinert, Arlington, TX (US); Michael L. Yeilding, Fremont, CA (US); Jeffrey Lynn Langley, Blue Spings, MO (US)

(73) Assignee: SBC Knowledge Ventures, L.P., Reno, NV (US)

( * ) Notice: Subject to any disclaimer, the term of this patent is extended or adjusted under 35 U.S.C. 154(b) by 42 days.

(21) Appl. No.: 10/898,851

(22) Filed: Jul. 26, 2004

(65) Prior Publication Data

US 2006/0018618 A1 Jan. 26, 2006

(51) Int. Cl.
*G02B 6/00* (2006.01)

(52) U.S. Cl. ............... 385/135; 385/134; 385/147; 340/542; 312/215

(58) Field of Classification Search ........ 385/134–135, 385/147; 340/542; 312/215
See application file for complete search history.

(56) References Cited

U.S. PATENT DOCUMENTS

| 5,126,732 A * | 6/1992 | Mardon ............... 340/5.33 |
| 5,274,731 A | 12/1993 | White |
| 5,540,339 A | 7/1996 | Lerman |
| 5,823,646 A | 10/1998 | Arizpe et al. |
| 6,170,928 B1 | 1/2001 | Eardley et al. |
| 2005/0116819 A1* | 6/2005 | Hoffman ............... 340/521 |
| 2005/0174237 A1* | 8/2005 | Maniaci ............... 340/545.2 |

* cited by examiner

*Primary Examiner*—John D. Lee
*Assistant Examiner*—James D. Stein
(74) *Attorney, Agent, or Firm*—Brooks Kushman P.C.

(57) ABSTRACT

A fiber distribution frame arrangement includes a fiber distribution frame. Fiber optic component panels are housed within the fiber distribution frame at respective positions. Doors are connected to the fiber distribution frame for the doors to open and close relative to the fiber distribution frame. Each door corresponds to one of the fiber optic component panels such that the door opens and closes relative to the corresponding fiber optic component panel when the door opens and closes relative to the fiber distribution frame. Actuators corresponding to the doors are positioned on the corresponding doors in order to lock the corresponding door to the fiber distribution frame upon actuation when the corresponding door is closed. A cable extends between each actuator for connecting the actuators together. A controller communicates with the actuators via the cable in order to control actuation of the actuators and monitor actuation status of the actuators.

20 Claims, 1 Drawing Sheet

FIBER DISTRIBUTION FRAME ARRANGEMENT HAVING A CENTRALIZED CONTROLLER WHICH UNIVERSALLY CONTROLS AND MONITORS ACCESS TO FIBER DISTRIBUTION FRAMES

BACKGROUND OF THE INVENTION

1. Field of the Invention

The present invention generally relates to fiber distribution frames and, more particularly, to a fiber distribution frame arrangement having a centralized controller which universally controls and monitors access to fiber distribution frames.

2. Background Art

A fiber distribution frame serves as an interface between outside plant fiber optic facilities entering a central office structure and fiber optic equipment installed within that same location. The fiber distribution frame provides a centralized point for the organization and administration of the fiber optic facility and intra-building fiber equipment cables; provides a flexible platform for future fiber growth; and provides re-configurable connections between any two terminations or appearances.

In its most basic form, a fiber distribution frame is a housing, cabinet, enclosure, etc., which houses fiber optic components. Fiber optic components include fiber optic cables, jumpers, strands, connectors, etc. In general, fiber optic components extend into and out of a fiber distribution frame. A fiber distribution frame typically has a plurality of panels arranged near the front-side of the frame for enabling incoming and exiting fiber optic components to be selectively cross-connected together.

A fiber distribution frame includes at least one door which is connected by a hinge to the front-side and/or the rear-side of the frame. The door opens and closes shut in order to provide and limit access of human personnel to the panels and the fiber optic components housed within the fiber distribution frame. The fiber distribution frame may include one door for covering the entire front-side of the frame or may include a set of doors with each door for covering a respective panel. When shut, the door(s) shields the panels and the fiber optic components from the outside environment and from inadvertent or unauthorized access by human personnel.

It is desirable to limit access by human personnel to fiber distribution frames. This is so because a fiber distribution frame is essentially a deployment of optically amplified networks. As the amplification factor of the optical signals communicated by the fiber optic components deployed within a fiber distribution frame increases, so increases the potential for inadvertent exposure by human personnel to optical radiation.

Accordingly, it is desirable to maintain the door(s) of a fiber distribution frame in a locked shut configuration in order to restrict inadvertent or unauthorized access to the fiber distribution frame. At times, this may be problematic because a fiber distribution frame may have many doors and, consequently, a door may be inadvertently left open with this condition being undetected for some time. Further, there may be many fiber distribution frames scattered throughout an area. Consequently, if the door(s) of the fiber distribution frames located in remote areas are inadvertently left open, this condition may also be undetected for some time.

DETAILED DESCRIPTION OF THE PREFERRED EMBODIMENT(S)

Figure 1:
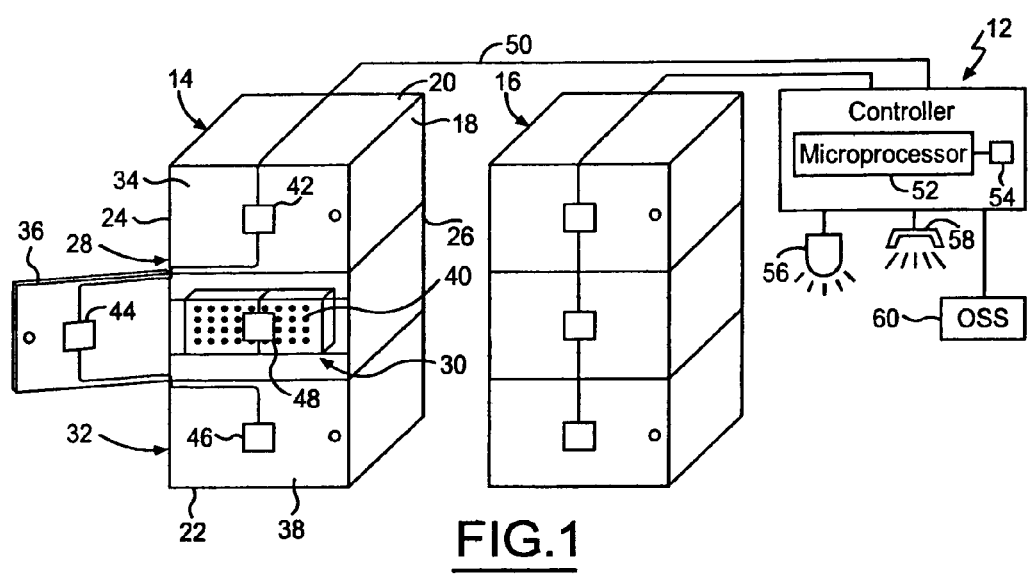
FIG. 1 illustrates a block diagram of a fiber distribution frame arrangement in accordance with the present invention.

The advantages of the fiber distribution frame arrangement in accordance with the present invention are numerous. For example, the fiber distribution frame arrangement provides an automated and mechanized means of securing "at risk" locations; provides suitable alarming; and provides visual and audible notifications of at risk locations for human optical protection.

The fiber distribution frame arrangement in accordance with the present invention has a centralized controller which universally controls and monitors access to panels and doors of the fiber distribution frames present in the arrangement. The controller enables all the doors of each fiber distribution frame to be closed and locked with the push of a button in order to prevent the panels of the fiber distribution frame from being exposed. The doors of a fiber distribution frame are universally cabled to the controller to permit the immediate lock-down of the panels in the fiber distribution frame when fiber optic components contained therein are communicating optical signals. Similarly, the controller enables the doors of each fiber distribution frame to be opened and unlocked with the push of a button in order to allow access to the panels of the fiber distribution frame.

The controller provides an office notification using both audible and visual indicators when doors of a fiber distribution frame are opened but are intended to be locked closed. The controller provides remote communication capabilities to alert other locations of the status of each door of a fiber distribution frame.

From a single push of a button (or remote access), a microprocessor of the controller transmits a relatively small amount of electrical current to operate an actuator (i.e., lock) positioned on each door of a fiber distribution frame in order to have the actuators lock shut the corresponding doors relative to the panels of the fiber distribution frame. The controller provides notification of any doors which have not been locked shut and alerts and provides alarms when a door is subsequently opened without the controller having authorized the release of the corresponding actuator.

Each actuator is an electromagnetic device which provides a positive lock to its associated door with suitable strength such that the door breaks open before the latch activator of the actuator releases upon being physically pried open. Each actuator has a unique serving address that is correlated with the physical location of the corresponding door and the corresponding fiber distribution frame. The serving addresses are programmed in at the controller.

The actuators associated with the doors of a fiber distribution frame are connected to the controller through a daisy chain arrangement. The use of a constant flow of current (i.e., direct current) from the controller to the actuators keeps the actuators charged and in the closed and locked position. The doors open normally when the controller releases the current. The opening of any one door does not disable the actuators of the remaining doors which are activated.

The aspects of the fiber distribution frame arrangement in accordance with the present invention are as follows: actuators (i.e., locks) are positioned on corresponding doors of a fiber distribution frame and the actuators are actuated to lock the doors to the fiber distribution frame in response to a command from a central location (i.e., the controller); the controller has one button lock and unlock control; the controller provides identification of each door that has been opened; each actuator requires a relatively large amount of strength to open; the arrangement provides protection within the confines of the door designs; the arrangement provides alarm notification both locally and through remote transmission to operation support system (OSS) centers; and the arrangement meets the security solutions for Optical Hazard Levels 3a, 3b, and 4 as described in the American National Standards Institute (ANSI) and the International Electrotechnical Commission (IEC).

The fiber distribution frame arrangement in accordance with the present invention is intended to augment existing panels and doors of a fiber distribution frame with the ability to secure the fiber distribution frame with the touch of a button. In addition, the fiber distribution frame arrangement provides the ability to release the doors of a fiber distribution frame from a single point or remotely.

In sum, the fiber distribution frame arrangement in accordance with the present invention provides an automated and mechanized means to physically and automatically lock the doors of a fiber distribution frame; generate alarms regarding the status of unlocked and opened doors; report the alarms remotely; and set off audible and light alarms when the doors are not locked closed (i.e., when the panels of the fiber distribution frame are not secured). Using the discrete ability with the microprocessor controlled devices, the fiber distribution frame arrangement in accordance with the present invention identifies any doors of a fiber distribution frame which are opened.

The cabling connecting the door actuators of a fiber distribution frame to the controller is routed via one loop from actuator-to-actuator thereby obviating the need for individual cables between each actuator and the controller. Of course, individual cabling between the controller and the actuators is also a suitable cabling arrangement if so desired. However, the key is to provide a cabling arrangement that overlays a set of panels of a fiber distribution frame and does not displace space for wiring and cabling that is required for the fiber optic components housed within the fiber distribution frame. As such, the daisy chain cabling arrangement provided by having one loop connect the actuators to the controller is preferable.

The product (i.e., the actuators, the controller, etc.) in accordance with the present invention can be used with any bay, relay rack, or shelf that has fiber optic appearances whether the high power signal is in a central office, a building or structure, or even at a customer's premises.

Referring now to FIG. 1, a fiber distribution frame arrangement 10 in accordance with the present invention is shown. Fiber distribution frame arrangement 10 generally includes a controller 12 and a plurality of fiber distribution frames 14, 16. Only two fiber distribution frames 14, 16 are shown in FIG. 1. It is to be appreciated that there may be any number of fiber distribution frames in arrangement 10.

Each fiber distribution frame 14, 16 generally includes the same elements. As such, only fiber distribution frame 14 will be described in further detail. Fiber distribution frame 14 includes a frame 18 having top and bottom surfaces 20 and 22 and two side surfaces 24 and 26. Surfaces 20, 22, 24, and 26 form the outlining segments of an enclosure, cabinet, chassis, etc., which has an exposed front-face.

Frame 18 is divided up into compartments 28, 30, and 32. Compartments 28, 30, and 32 generally house fiber optic components therein. Frame 18 may have any number of compartments. For each compartment 28, 30, and 32, a respective door 34, 36, and 38 is connected by a hinge or the like to side surface 24 of frame 18. Doors 34, 36, and 38 open and close with respect to the corresponding compartment 28, 30, and 32. Doors 34 and 38 are shown in FIG. 1 as being shut closed. As such, doors 34 and 38 are shown in FIG. 1 as secluding compartments 28 and 32 from the outside environment and thereby limiting access to fiber optic components contained therein. Door 36 is shown in FIG. 1 as being opened. As such, door 36 is shown in FIG. 1 as exposing compartment 30 to the outside environment and thereby allowing access to fiber optic components contained therein.

Each compartment 28, 30, and 32 has a corresponding panel extending across its front side between side surfaces 24 and 26 of frame 18. Panel 40 in compartment 30 is shown in FIG. 1. Because door 36 is opened, panel 40 is exposed to the outside environment and may be accessed by human personnel. Like the other panels in compartments 28 and 32, panel 40 is a fiber optic component panel which interconnects fiber optic components contained within frame 18.

In accordance with the present invention, compartments 28, 30, and 32 are respectively associated with electromagnetic actuators (i.e., locks) 42, 44, and 46. Actuators 42, 44, and 46 are respectively positioned on doors 34, 36, and 38 of the corresponding compartments 28, 30, and 32. Actuators 42, 44, and 46 each include complementary actuator elements which are positioned on the panels of the corresponding compartments 28, 30, and 32. For example, actuator element 48 which is complementary to actuator 44 is shown in FIG. 1 as being positioned on panel 40 in compartment 30. Actuators 42, 44, and 46 with their complementary actuator elements function to lock shut corresponding doors 34, 36, and 38. That is, upon being actuated, actuators 42, 44, and 46 meet with their complementary actuator elements to lock doors 34, 36, and 38 when the doors are shut closed relative to frame 18.

To this end, actuators 42, 44, and 46 are connected in a daisy chain arrangement by a cable 50 to controller 12. Controller 12 is generally operable to actuate actuators 42, 44, and 46 in order to lock doors 34, 36, and 38 closed. Controller 12 includes a microprocessor 52 which transmits electrical current to actuators 42, 44, and 46 via cable 50 in order to actuate the actuators upon a push of a button 54. Likewise, through the push of button 54, controller 12 cuts the electrical current to actuators 42, 44, and 46 via cable 50 in order to unlock the actuators.

Actuators 42, 44, and 46 each have a corresponding serving address. The serving addresses correspond to the doors 34, 36, and 38 and the physical location of frame 18. The serving addresses are programmed in at controller 12. Controller 12 uses the serving addresses in order to individually control and monitor the actuation of actuators 42, 44, and 46. For example, controller 12 transmits a control signal having the serving address of actuator 44 over cable 50. Each actuator 42, 44, and 46 receives this control signal as each actuator is connected to cable 50. However, actuators 42 and 46 disregard the control signal as the control signal does not have their serving addresses. Likewise, actuator 44 acts upon the control signal as the control signal has its serving address. As an example, the control signal transmitted by controller 12 contains the command for actuator 44 to unlock. In turn, actuator 44 unlocks in order to allow door 36 to be opened for access to panel 40 and compartment 30. Upon actuator 44 unlocking, the remaining actuators 42 and 46 are still maintained in the locked configuration.

Controller 12 is operable to monitor which actuators 42, 44, and 46 are unlocked and locked. Controller 12 is further operable to monitor which actuators 42, 44, and 46 are unlocked when these actuators are intended to be locked. To this end, actuators 42, 44, and 46 communicate status information to controller 12 via cable 50. The status information from an actuator includes the serving address of the actuator and the actuated status of the actuator.

In the event that an actuator is unlocked when it should be locked, controller 12 generates alarms to alert human personnel. Controller 12 includes a light 56 for generating a visual alarm for human personnel to see and further includes a speaker 58 for generating an audible alarm for human personnel to hear. Controller 12 activates alarms 56 and 58 upon at least one of actuators 42, 44, and 46 being unlocked when these actuators are intended to have been locked. As such, controller 12 activates alarms 56 and 58 upon at least one of doors 34, 36, and 38 being opened when these doors are intended to have been locked closed. In sum, controller 12 provides alerts when any of doors 34, 36, and 38 are subsequently opened without the controller having given the proper release of the corresponding actuators 42, 44, and 46.

Controller 12 remotely communicates with an operation support system (OSS) 60 to provide the OSS with alerts regarding actuators and doors which are not locked. The alerts generated by controller 12 contain identification of doors 34, 36, and 38 which have been opened or unlocked (or closed and locked).

Controller 12 provides a constant current (i.e., direct current) to actuators 42, 44, and 46 via cable 50 in order to keep the actuators charged and in the closed and locked position. When controller 12 releases the current, actuators 42, 44, and 46 unlock in order to unlock corresponding doors 34, 36, and 38. Controller 12 also has the ability to use a force C relay in a circuit to all actuators 42, 44, and 46 that closes an alarm circuit relay when the current is cut. When the current is replaced, the relay operates and releases from the alarm side.

Thus, it is apparent that there has been provided, in accordance with the present invention, a fiber distribution frame arrangement having a centralized controller which universally controls and monitors access to fiber distribution frames that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A fiber distribution frame arrangement, the arrangement comprising:

a fiber distribution frame for housing a plurality of fiber optic components therein;

a plurality of fiber optic component panels housed within the fiber distribution frame at respective positions;

a plurality of doors connected to the fiber distribution frame, wherein each door opens and closes relative to a corresponding one of the panels when the door opens and closes relative to the fiber distribution frame;

a plurality of actuators, each actuator having a complementary actuator element, wherein each actuator is positioned on a corresponding one of the doors and its complementary actuator element is positioned on the panel which corresponds to the door, wherein each actuator and its complementary actuator element engage one another upon the actuator being actuated to lock the corresponding door to the fiber distribution frame when the corresponding door is closed relative to the fiber distribution frame; and a controller operable to communicate with the actuators in order to control actuation of the actuators and monitor the actuation status of the actuators.

2. The arrangement of claim 1 wherein:

the controller transmits an electrical current signal to the actuators via the cable in order to actuate the actuators.

3. The arrangement of claim 2 wherein:

the controller cuts off the electrical current signal transmitted to the actuators via the cable in order to un-actuate the actuators.

4. The arrangement of claim 1 wherein:

each actuator has a serving address;

wherein the controller uses the serving addresses of the actuators in order to transmit control signals to selected ones of the actuators via the cable.

5. The arrangement of claim 4 wherein:

the actuators communicate status signals regarding the actuation status of the actuators to the controller via the cable, the status signals communicated by the actuators including the serving addresses of the actuators;

wherein the controller determines the actuation status of actuators in response to the status signals and identifies which actuators are actuated and un-actuated by using the serving addresses contained in the status signals.

6. The arrangement of claim 1 wherein:

the controller monitors actuation status of the actuators to determine if any of the doors are opened when the corresponding actuators have been actuated.

7. The arrangement of claim 1 wherein:

the controller and the actuators are connected together in a daisy chain arrangement.

8. A fiber distribution frame arrangement, the arrangement comprising:

a fiber distribution frame;

a plurality of fiber optic component panels housed within the fiber distribution frame at respective positions;

a plurality of doors connected to the fiber distribution frame for the doors to open and close relative to the fiber distribution frame, each door corresponding to one of the fiber optic component panels such that the door opens and closes relative to the corresponding fiber optic component panel when the door opens and closes relative to the fiber distribution frame;

a plurality of actuators, each actuator corresponding to one of the doors and being positioned on the corresponding door in order to lock the corresponding door to the fiber distribution frame upon actuation when the corresponding door is closed;

a cable extending from actuator to actuator for connecting the actuators together; and a controller connected to the cable, the controller being operable to communicate with the actuators via the cable in order to control actuation of the actuators and monitor actuation status of the actuators;

wherein each actuator includes a complementary actuator element, wherein the complementary actuator element of each actuator is positioned on the fiber optic component panel corresponding to the door which corresponds with the fiber optic component panel, wherein the complementary actuator element of each actuator is operable with the actuator to lock the corresponding door to the corresponding fiber optic component panel upon actuation when the corresponding door is closed in order to lock the corresponding door to the fiber distribution frame.

9. The arrangement of claim 8 wherein:
the actuators are electro-magnetic actuators.

10. The arrangement of claim 9 wherein:
the controller transmits an electrical signal to the actuators via the cable in order to actuate the actuators.

11. The arrangement of claim 10 wherein:
the controller cuts off the electrical signal transmitted to the actuators via the cable in order to un-actuate the actuators.

12. The arrangement of claim 8 wherein:
each actuator has a serving address;
wherein the controller uses the serving addresses of the actuators in order to transmit control signals to selected ones of the actuators via the cable.

13. The arrangement of claim 12 wherein:
the actuators communicate status signals regarding the actuation status of the actuators to the controller via the cable, the status signals communicated by the actuators including the serving addresses of the actuators;
wherein the controller determines the actuation status of actuators in response to the status signals and identifies which actuators are actuated and un-actuated by using the serving addresses contained in the status signals.

14. The arrangement of claim 13 wherein:
the controller includes an alarm for generating an alert when an actuator which is intended to be actuated has an un-actuated status.

15. The arrangement of claim 14 wherein:
the alarm is a lamp for generating a visual alert for human personnel to see.

16. The arrangement of claim 14 wherein:
the alarm is a speaker for generating an audible alert for human personnel to hear.

17. The arrangement of claim 14 wherein:
the controller remotely transmits alerts to an operation support system.

18. The arrangement of claim 8 wherein:
the controller monitors actuation status of the actuators to determine if any of the doors are opened when the corresponding actuators have been actuated.

19. The arrangement of claim 8 wherein:
the controller and the actuators are connected together in a daisy chain arrangement.

20. A fiber distribution frame arrangement comprising:
a fiber distribution frame;
a fiber optic component panel housed within the fiber distribution frame;
a door connected to the fiber distribution frame, wherein the door opens and closes relative to the panel when the door opens and closes relative to the fiber distribution frame;
an actuator having a complementary actuator element, wherin the actuator is positioned on the door and the complementary actuator element is positioned on the panel, wherein the actuator and the complementary actuator element engage one another upon the actuator being actuated to lock the door to the fiber distribution frame when the door is closed relative to the fiber distribution frame; and
a controller operable to communicate with the actuator to control actuation of the actuator.

* * * * *